(12) United States Patent
Jin et al.

(10) Patent No.: US 8,874,512 B2
(45) Date of Patent: Oct. 28, 2014

(54) DATA REPLICATION METHOD AND SYSTEM FOR DATABASE MANAGEMENT SYSTEM

(75) Inventors: Eun Sook Jin, Seoul (KR); Ki Eun Park, Bucheon-si (KR); Gab Young Kim, Seoul (KR); Jae Bong Seo, Seoul (KR)

(73) Assignee: NHN Business Platform Corporation, Seongnam-Si (KR)

( * ) Notice: Subject to any disclaimer, the term of this patent is extended or adjusted under 35 U.S.C. 154(b) by 777 days.

(21) Appl. No.: 12/600,205

(22) PCT Filed: Apr. 29, 2008

(86) PCT No.: PCT/KR2008/002421
§ 371 (c)(1),
(2), (4) Date: Nov. 13, 2009

(87) PCT Pub. No.: WO2008/143408
PCT Pub. Date: Nov. 27, 2008

(65) Prior Publication Data
US 2010/0250491 A1    Sep. 30, 2010

(30) Foreign Application Priority Data
May 21, 2007  (KR) .................. 10-2007-0049289

(51) Int. Cl.
*G06F 17/30* (2006.01)
(52) U.S. Cl.
CPC .............................. *G06F 17/30575* (2013.01)
USPC ........................... 707/634; 707/638; 707/639
(58) Field of Classification Search
USPC ........... 707/610, 640, 999.204, 634, 638, 639
See application file for complete search history.

(56) References Cited

U.S. PATENT DOCUMENTS

| 5,280,611 | A | * | 1/1994 | Mohan et al. ........................... 1/1 |
| 5,434,994 | A | * | 7/1995 | Shaheen et al. ............... 709/223 |
| 5,640,561 | A | * | 6/1997 | Satoh et al. ............................ 1/1 |
| 6,044,381 | A |   | 3/2000 | Boothby et al. |
| 2002/0073082 | A1 | * | 6/2002 | Duvillier et al. .................. 707/3 |
| 2002/0103816 | A1 | * | 8/2002 | Ganesh et al. ................ 707/204 |
| 2004/0098425 | A1 | * | 5/2004 | Wiss et al. .................... 707/204 |

(Continued)

FOREIGN PATENT DOCUMENTS

| EP | 0950955 | 10/1999 |
| JP | 11-327988 | 11/1999 |

(Continued)

OTHER PUBLICATIONS

Dominic J. Delmolino, "Strategies and Techniques for Using Oracle7 Replication", Oracle Corporation, Revision 2.1.6.2, Part A34042, pp. 1-25, May 8, 1995.

(Continued)

*Primary Examiner* — Noosha Arjomandi
(74) *Attorney, Agent, or Firm* — Harness, Dickey & Pierce, P.L.C.

(57) ABSTRACT

Disclosed is a data replication method in a Database Management System (DBMS). The data replication method includes generating a replication log through a transaction log of a master database to thereby transmit the generated replication log to a distributor, determining a slave host distributing the replication log to thereby distribute the replication log to the corresponding slave host, and reflecting the replication log in a slave database.

20 Claims, 10 Drawing Sheets

(56) References Cited

U.S. PATENT DOCUMENTS

| | | | |
|---|---|---|---|
| 2004/0158588 A1* | 8/2004 | Pruet, III | 707/204 |
| 2005/0071389 A1* | 3/2005 | Gupta | 707/204 |
| 2005/0091217 A1* | 4/2005 | Schlangen | 707/10 |
| 2005/0262170 A1* | 11/2005 | Girkar et al. | 707/204 |
| 2005/0283522 A1* | 12/2005 | Parkkinen et al. | 709/210 |
| 2006/0136686 A1 | 6/2006 | Cherkauer et al. | |
| 2007/0174315 A1* | 7/2007 | Leff et al. | 707/101 |
| 2007/0185852 A1* | 8/2007 | Erofeev | 707/4 |
| 2007/0276886 A1* | 11/2007 | Ishikawa et al. | 707/204 |
| 2007/0288525 A1* | 12/2007 | Stakutis et al. | 707/200 |
| 2008/0183656 A1* | 7/2008 | Perng et al. | 707/2 |

FOREIGN PATENT DOCUMENTS

| | | |
|---|---|---|
| JP | 2002-318718 | 10/2002 |
| JP | 2003-006011 | 1/2003 |
| JP | 2005-527912 | 9/2005 |
| KR | 1020040088397 | 10/2004 |
| KR | 1020050064278 | 6/2005 |

OTHER PUBLICATIONS

Extended European Search Report issued by the EPO on Dec. 21, 2010 for the corresponding European Patent Application No. 08753225.5.

* cited by examiner

DATA REPLICATION METHOD AND SYSTEM FOR DATABASE MANAGEMENT SYSTEM

CROSS-REFERENCE TO RELATED APPLICATIONS

This application is the National Stage of International Application No. PCT/KR2008/002421, filed Apr. 29, 2008, and claims priority from and the benefit of Korean Patent Application No. 10-2007-0049289, filed on May 21, 2007, which are both hereby incorporated by reference for all purposes as if fully set forth herein.

BACKGROUND OF THE INVENTION

1. Field of the Invention

The present invention relates to a data replication method and system in a Database Management System (DBMS).

2. Discussion of the Background

Database replication is a technique for copying an object stored in a single database to another database physically separated to thereby be used in at least two database servers in a distributed database scheme. This replication technique may distribute accesses of application programs using the same object to various database servers, thereby increasing the performance or allowing a replicated database server to have other applications, and thus simultaneously satisfying different operation requirements. Also, the replicated database may be rapidly replaced when faults occur in a database server during the operation, thereby significantly increasing reliability.

The above-described replication technique may be utilized when a single database server fails to satisfy requirements for the performance of the application programs. For example, read operations are distributed to various database servers with identical data, thereby improving the performance of the entire system.

FIG. 1 is an example used for describing a structure of a replication system for load distribution according to a conventional art. In the case of general replication, a master database 102 may allow read and write operations, however, a slave database 103, 104, or 105 may allow only the read operation, and thereby performance-improvement effects using the data replication may have limitations for write operations, and show dramatic improvements for read operations. Thus, many applications such as a blog, bulletin board, news, and the like which are used for Internet services and the like may be included in the above general replication. Specifically, data in a web service 101 may be stored in a master database 102 through a write operation, and modifications of the master database 102 may be reflected in slave databases 103 to 105 using the replication technique. Also, data may be provided through the read operation. In this instance, the data may be provided via the slave databases 103 to 105 in view of characteristics of the web services 101 having a significantly high frequency of occurrence of read operations as opposed to write operations. As described above, when using the replication technique, an aggregate load in the database may be distributed, and any one of slave hosts may replace a master host when a fault occurs in the master host including a master database, thereby increasing reliability.

However, as for the replication technique of the conventional art, there arise several problems in that change of a schema may not be replicated in the slave database, change detail-automatic extraction via the slave database may be impossible, and a desired replication environment such as a ratio of the master host to the slave host of N:M may be difficult to be achieved. Also, disadvantageously, an object to be replicated may be designated only in a database unit, a replication delay time may be difficult to be measured, and data synchronization status between the original and the replication may be difficult to be confirmed. Also, disadvantageously, a master transaction archival log may not be confidently eliminated by checking the replication processing status.

SUMMARY OF THE INVENTION

An aspect of the present invention provides a new technique for a data replication method and system in a Database Management System (DBMS).

An aspect of the present invention provides a data replication method and system in which an aggravated load in a database may be distributed through a master database, a slave database, and a distributor. Any one of the slave hosts may replace a master host when a fault occurs in a master host including the master database, thereby effectively coping with the fault. Changed contents with respect to only the slave database may be rapidly collected even when periodical collection with respect to simultaneously updated data is needed.

An aspect of the present invention provides a data replication method and system in which, when a schema is changed in a master database of a master host. The change may be replicated in the slave database of the slave host, and a desired replication environment, such as a ratio of the master host to the slave host of N:M, may be configured.

According to an aspect of the present invention, there is provided a data replication method in a Database Management System (DBMS). The data replication method includes: generating a replication log through a transaction log of a master database to thereby transmit the generated replication log to a distributor; determining a slave host distributing the replication log to thereby distribute the replication log to the corresponding slave host; and reflecting the replication log in a slave database.

In this instance, the replication log includes modifications of the master database, and the generating of the replication log may include: analyzing the transaction log in a replication server included in a master host to thereby generate the replication log being composed of the modifications; and transmitting the replication log from the replication server to a replication agent included in the distributor.

Also, the replication server may act as a processor for processing a transmission request with respect to the transaction log received from at least one replication agent, and include a first thread for processing the transmission request and a second thread for verifying the transaction log through the master database.

Also, the replication server may temporarily store the replication log using a plurality of buffers when a plurality of replication logs are generated in the transaction unit, and transmit the temporarily stored replication log to the replication agent of the corresponding distributor.

Also, the data replication method may further include: reflecting, in the slave database via the distributor, modifications with respect to a schema of the master database; and reflecting, in a distribution database included in the distributor, modifications with respect to at least one of an index, trigger, and user account of the master database. In this instance, the distributor reflects, in a slave host acting as another master host when a fault occurs in the master host, the at least one of the index, trigger, and the user account.

According to an aspect of the present invention, there is provided a data replication system in a DBMS, the data replication system including: a master host for generating a replication log through a transaction log of a master database to thereby transmit the generated replication log to a distributor; the distributor for determining a slave host distributing the replication log to thereby distribute the replication log to the corresponding slave host; and the slave host for receiving the replication log to thereby reflect the received replication log in a slave database.

In this instance, the replication log may include modifications of the master database, and the master host may include a master database acting as an original database to be an object of the replication. A replication server may analyze the transaction log of the master database to thereby generate the replication log being composed of the modifications, and may transmit the generated replication log to the distributor.

DETAILED DESCRIPTION OF THE ILLUSTRATED EMBODIMENTS

Figure 1:
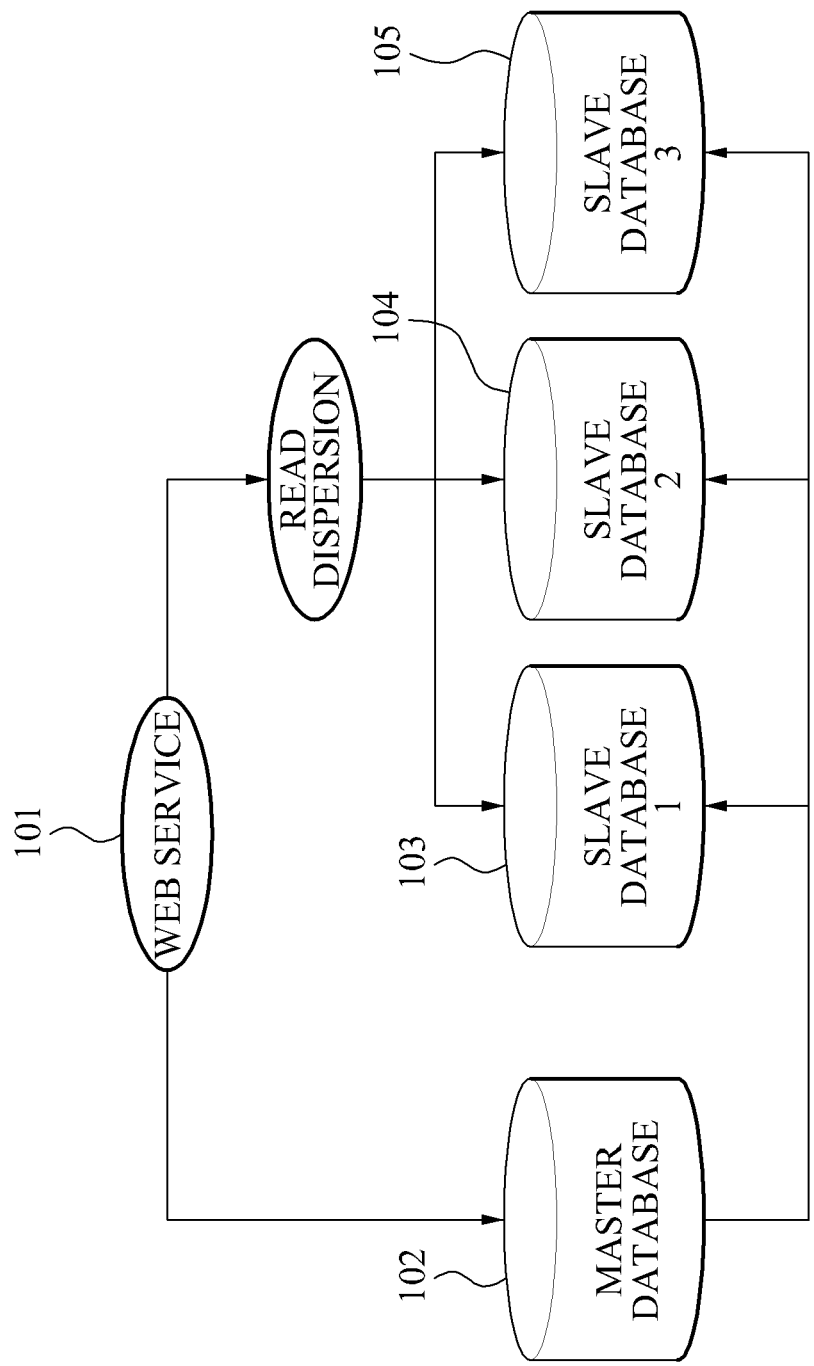
FIG. 1 is an example used for describing a structure of a replication system for load distribution according to a conventional invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
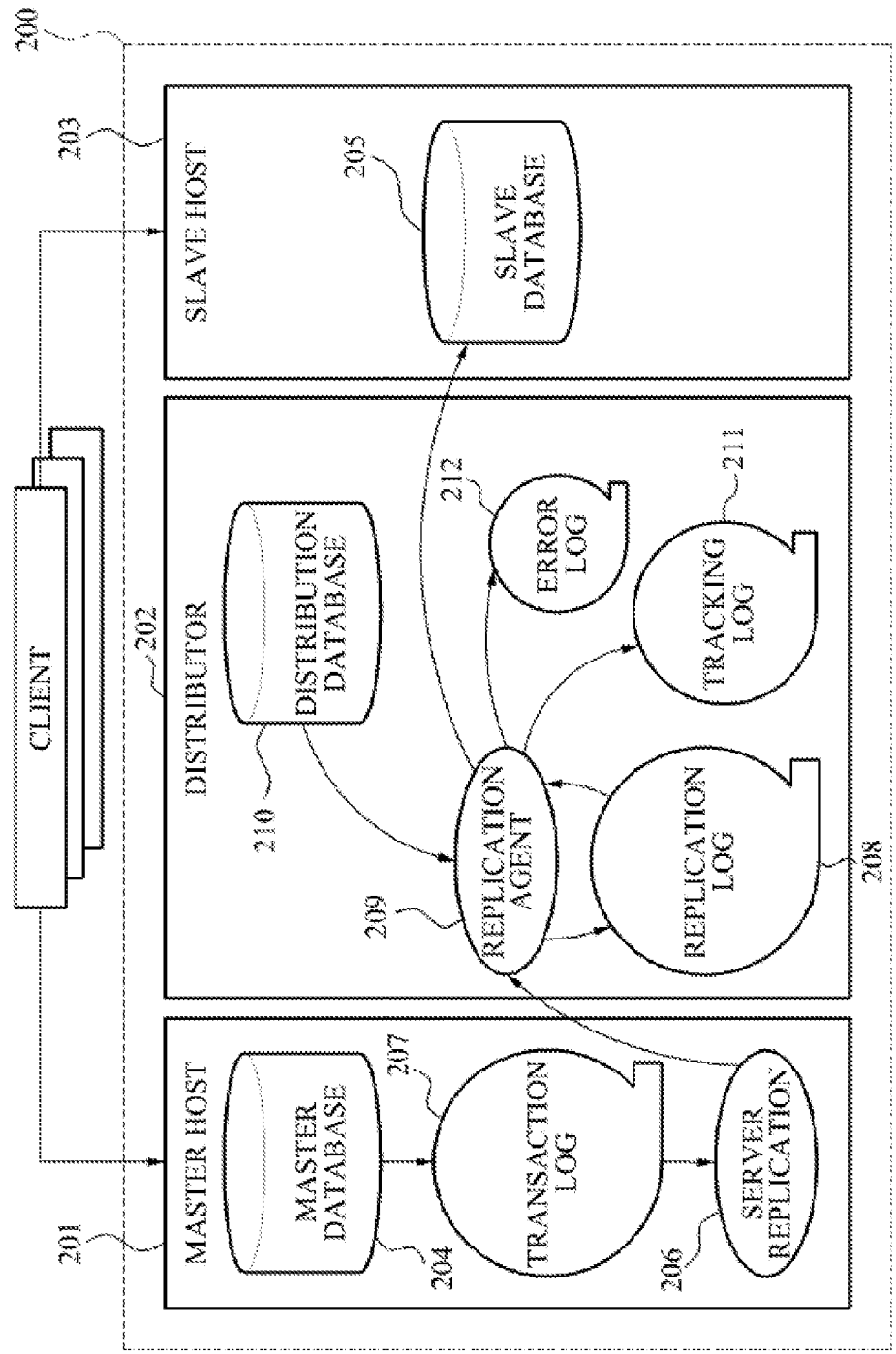
FIG. 2 is a schematic diagram illustrating a data replication system according to the present invention.

FIG. 2 is a schematic diagram illustrating a data replication system 200 according to the present invention.

The data replication system 200 includes a master host 201, a distributor 202, and a slave host 203. In this instance, each of the master host 201, distributor 202, and slave host 203 may be composed of a plurality of hosts in order to constitute a desired structure such as a ratio of the master host 201 to the slave host 203 of N:M; however, as illustrated in FIG. 2, they are composed of a single host in order to a schematically describe the data replication system 200.

A master database 204 included in the master host 201 is an original database to be a replicated object, which may allow various operations such as read and write operations, and the like to be performed therein. Conversely, a slave database 205 included in the slave host 203 is a database where the original database is replicated, which may allow only the read operation to be performed therein. This is for the purpose of distributing a load with respect to the read operation in web services in which the read operation, that is, download of data may more frequently occur rather than the write operation, that is, upload of data. Thus, the read operation may be distributed and performed in a plurality of slave databases.

First, when the replication is set, a replication server 206 included in the master host 201 may read a transaction log 207 of the master database 204 to generate a replication log 208 being composed of only information on the replication, and transmit the generated replication log to a replication agent 209 included in the distributor 202. In this instance, the distributor 202 may be set within the master host 201 or slave host 203, and may also be set in a separate host in order to fully guarantee availability.

The replication agent 209 may read a distribution database 210 included in the distributor 202, and determine how to replicate, in an arbitrary slave host 203, the replication log 208 received from the master host 201, and more specifically, the replication server 206. In this instance, the distributor 202 may act as a database for managing all meta-data about replication configuration, and allow the replication agent 209 to include disposition information of the master host 201 and slave host 203.

Specifically, the replication agent 209 may temporarily store the replication log 208 received from the replication server 206 in a storage device such as a buffer, and distribute the replication log 208 in the slave database 205 included in the slave host, thereby enabling the replication log 208, that is, modifications of the master database 204, to be reflected in the slave database 205. In this process, the replication agent 209 may manage a tracking log 211 in order to track a reflected state in each of the slave databases, and store all errors occurring while distributing the replication log 208 in an error log 212.

The replication database 200, as described above, may replicate modifications of the master database 204 in each of the slave databases 205. These replications will be described in detail with reference to FIGS. 3 to 10.

Figure 3:
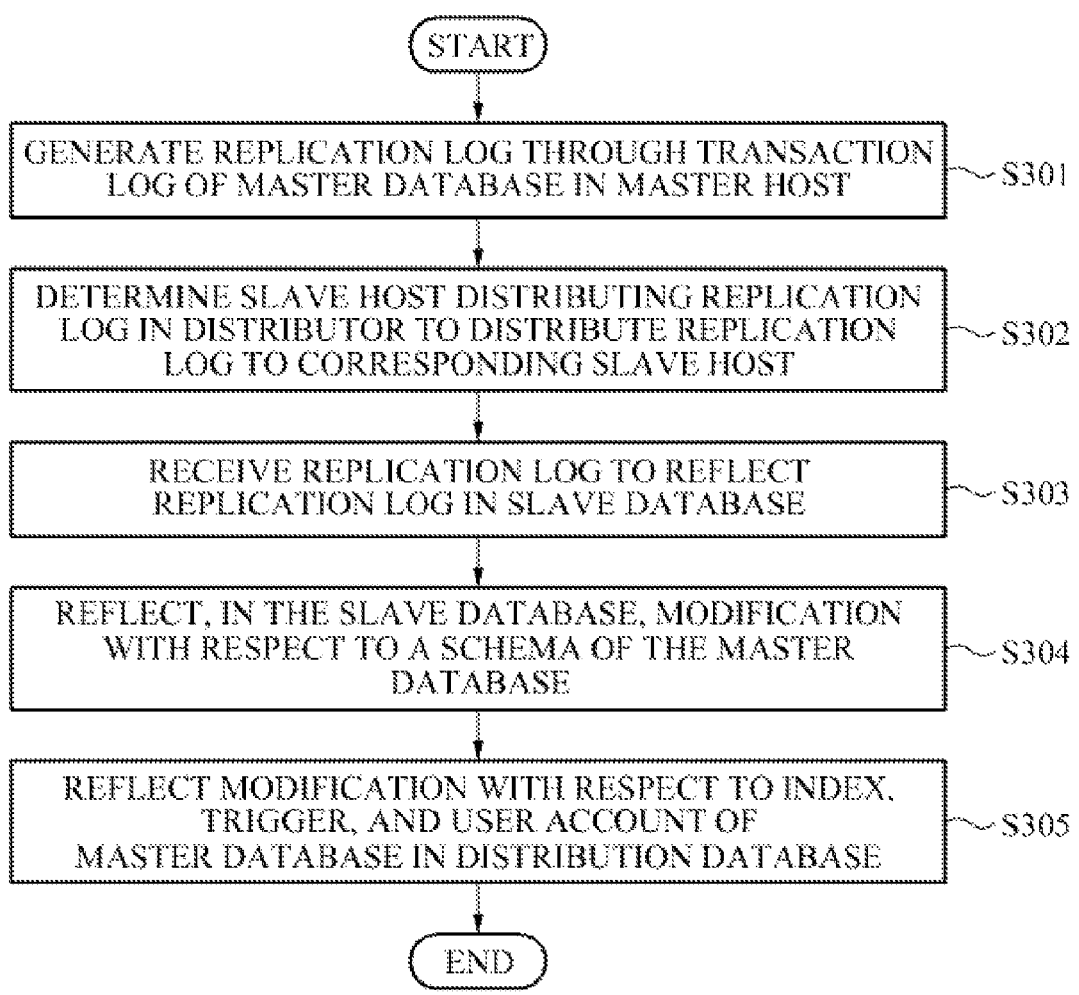
FIG. 3 is a flowchart illustrating a data replication method in a Database Management System (DBMS) according to an exemplary embodiment of the invention.

FIG. 3 is a flowchart illustrating a data replication method in a Database Management System (DBMS) according to an exemplary embodiment of the invention.

In operation S301, the master host 201 generates a replication log through a transaction log 207 of the master database 204, and transmits the generated replication log to the distributor 202. In this instance, the replication log may include modifications of the master database 204, and the master host 201 may transmit, to the distributor 202, the replication log, that is, the modifications via the replication server 206 included in the master host 201. Also, the master database 204 may act as an original database to be an object of the replication, which may allow all database operations to be performed therein.

As described above, operation S301 for transmitting the replication log to the distributor 202 will be described in detail with reference to FIG. 4.

As examples of data replication schemes, a synchronous replication for guaranteeing coherence of data may be accomplished by processing operations (1) updating data of the master database 204 and (2) updating data of the slave database 205 as a single transaction; and an asynchronous replication for dividing the operations (1) and (2) to be performed may be given.

In this instance, the synchronous replication may have a problem in that faults occurring in a single system may affect the entire system to thereby deteriorate the efficiency in view of the availability. For example, service operations in even a master system may be interrupted due to faults occurring in a slave system. Conversely, in the case of the asynchronous replication, modifications may be asynchronously reflected in the slave database 205 by utilizing a transaction log 207 of the master database 204, so that dependence between servers constituted by the replication may be minimized, thereby not affecting the master system even when faults occur in the slave system.

Specifically, the data replication method and system according to the present invention may provide a replication function through the asynchronous replication method using the transaction log 207, thereby guaranteeing coherence of data as well as a maximum availability. For this purpose, the distributor 202 may be used as a relay system between the master host 201 and the slave host 203.

Also, the transaction log for the above-described asynchronous replication may be composed of at least one transaction incorporating all modifications occurring in the master database 204, and include an undo log for archiving a previous data image for the purpose of aborting the updating operation and a redo log for archiving a data image after performing the updating. The replication log 208 may include only the redo log. More specifically, the replication log 208 may include a single transaction classified into the redo log in order to sequentially process the transactions. The transaction log and the replication log 208 will be described in detail with reference to FIG. 5.

In operation S302, the distributor 202 determines a slave host 203 distributing the replication log 208 to thereby distribute the replication log 208 to a corresponding slave host. In this instance, the distributor 202 may include a distribution database 210 and a replication agent 209 for the purpose of determining the slave host 203 distributing the replication log 208. As a result, coherence and availability may be guaranteed with respect to the above-described asynchronous replication. Operation S302 for distributing the replication log through the above-described distribution database and replication agent 209 will be described in detail with reference to FIG. 6.

In operation S303, the slave host 203 receives the replication log 208 to reflect the received replication log 208 in the slave database 205. In this instance, the slave database 205 is a database to be a destination of the replication, and may reflect modifications of the master database 204. In this manner, the master database 204 and the slave database 205 are synchronized with each other, and may distribute and perform an upload of data via the master database 204 and a download of data via the slave database 205, respectively, thereby reducing a load with respect to the read operation.

In operation S304, the data replication system 200 reflects, in the slave database 205, modifications about a schema of the master database 204. The slave database 205 may define the schema independently with the master database 204 for flexibility. Specifically, at least one of a separate class, index, trigger, and user account, other than a class replicated from the master database 204 may be generated, and even the write operation may be performed with respect to an additionally generated class. For example, the slave database 205 may independently define and operate classes 3 and 4 while the replication is performed with respect to classes 1 and 2 from the master database 204.

In operation S305, the data replication system 200 reflects, in a distribution database 210 included in the distributor 202, modifications about at least one of an index, trigger, and user account of the master database 204. In this instance, the distributor 202 may reflect at least one of the index, trigger, and user account in the slave host 203 acting as another master host when a fault occurs in the master host 201. In this manner, the reflection of the schema, index, trigger, and user account in the slave database 205 will be described in detail with reference to FIG. 7.

The master host 201 and slave host 203 as described above may be composed with a ratio of N:M therebetween, and an asynchronous replication may be performed through at least one distributor between the master host 201 and the slave host 203. Configurations of the master host 201 and slave host 203 will be described in detail with reference to FIGS. 9 and 10.

Figure 4:
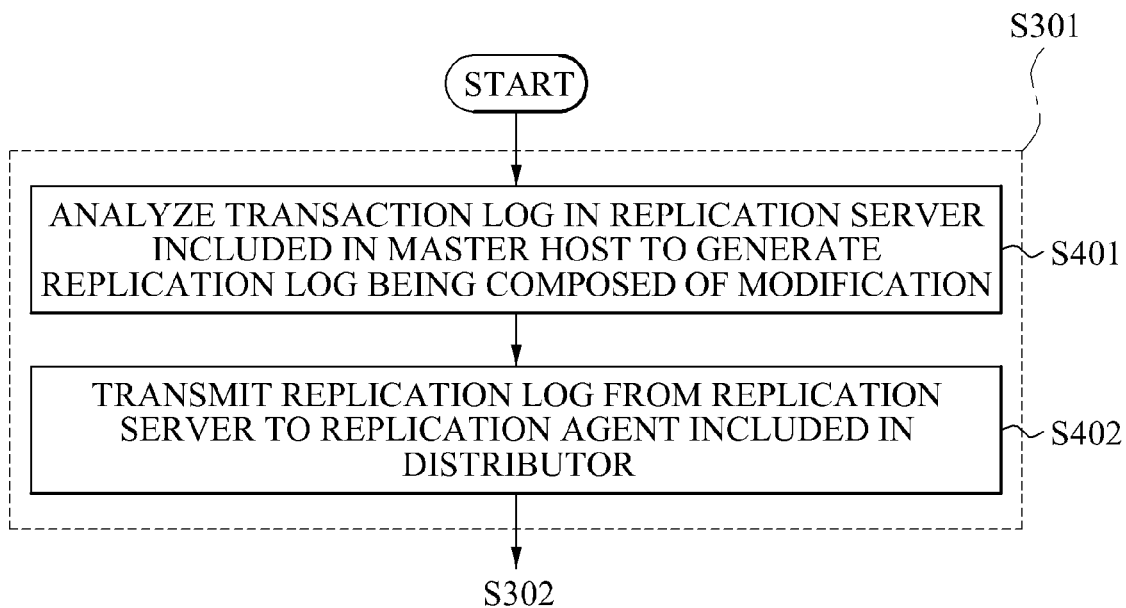
FIG. 4 is a flowchart illustrating a method for generating a replication log in a master host to transmit the generated replication log to a distributor according to an exemplary embodiment of the invention.

FIG. 4 is a flowchart illustrating a method for generating a replication log 208 in a master host 201 to transmit the generated replication log 208 to a distributor 202 according to an exemplary embodiment of the invention. As illustrated in FIG. 4, operations S401 and S402 may be included in operation S301 of FIG. 3.

In operation S401, a replication server 206 included in the master host 201 analyzes the transaction log 207 to thereby generate the replication log 208 being composed of the modifications. In this instance, the replication server 206 may be a processor for processing a transmission request for the transaction log 207 received from at least one replication agent 209, and may include a first thread for processing the transmission request and a second thread for verifying the transaction log through the master database 204.

Also, the replication server 206 may temporarily store the replication log 208 using a plurality of buffers when a plurality of replication logs are generated in the transaction unit to thereby transmit the temporarily stored replication log 208 to the replication agent of the corresponding distributor. Specifically, the replication log 208 may include a single transaction, that is, the transaction unit, and the replication server 206 may process the replication while maintaining an order with respect to the plurality of transactions. The transaction using the plurality of buffers will be described in detail with reference to FIG. 5.

Here, the replication agent 209 is a processor for substantially performing a replication, which is included in the distributor 202. The replication server 206 may verify the transaction log according to the transmission request for the transaction log 207 of the master database 204 of the master host 202 to thereby generate the replication log 208.

In operation S402, the replication server 206 transmits the replication log 208 to the replication agent 209 included in the distributor 202. The replication log 208 may include modifications of the master database 204, and the replication server 206 may transmit the replication log 208 to the replication agent 209, thereby enabling the replication agent 209 to perform the replication between the master database 204 and the slave database 205.

Figure 5:
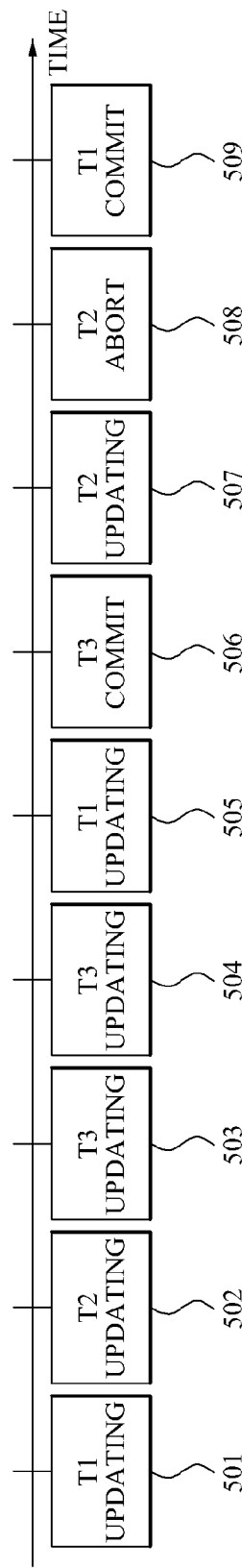
FIG. 5 is an example used for describing a transaction log and replication log according to an exemplary embodiment of the invention.

FIG. 5 is an example used for describing a transaction log and replication log according to an exemplary embodiment of the invention.

The transaction log 207 is a file for recording all modifications of the database server, that is, an updating operation. The master host 201 may generate undo or redo logs even when a fault occurs while simultaneously processing different transactions. In this instance, as described above, the undo log is the log for archiving the previous image in order to abort the updating operation, and the redo log is a log for archiving the data image after performing the updating operation in order to again perform the updating operation. In the master database 204, a plurality of transactions is simultaneously in an active state. For example, as illustrated in FIG. 5, updating operations corresponding to reference numerals 501 to 509 may be performed with respect to 'T1' to 'T3'. Here, the data replication system 200 may read the transaction log 207 recording the updating operation to thereby extract only the redo log, and reflect, in a slave database 205, the extracted redo log according to a commit order of the transaction.

Here, a commit may denote an operation performed such that all operations included in a single transaction are performed in a Distributed Transaction Processing (DTP). Updated contents of the corresponding database are recorded in an operation area, that is, a memory, and then completion for application of the transaction is requested at the time of being determined that the application is completed. Also, the determined completion time may denote a commit time. When the commit is performed, updating data may be substantially recorded in a memory device such as a magnetic disk, the related lock may be released, and then updated contents may be accessed from another transaction.

In this instance, aborted transaction may not be reflected in the slave database 205. Specifically, as described above, only the transactions 'T1' and 'T3' are reflected in the slave database 205, and the aborted transaction, that is, the transaction 'T2' such as a reference numeral 508 may not be reflected in the slave database 205.

In the above-described case, a transaction may be simultaneously requested by several clients to thereby be processed in the master host 201, however, a single thread may sequentially reflect, for each slave database, an operation for applying the transaction in the slave database 205 for the purpose of guaranteeing an order of the transaction. In this instance, the replication server 206 included in the master host 201 and the replication agent 209 included in the distributor 202 may temporarily store the transaction through a buffer with respect to the plurality of transactions, and perform the replication while maintaining the order of the transaction.

Figure 6:
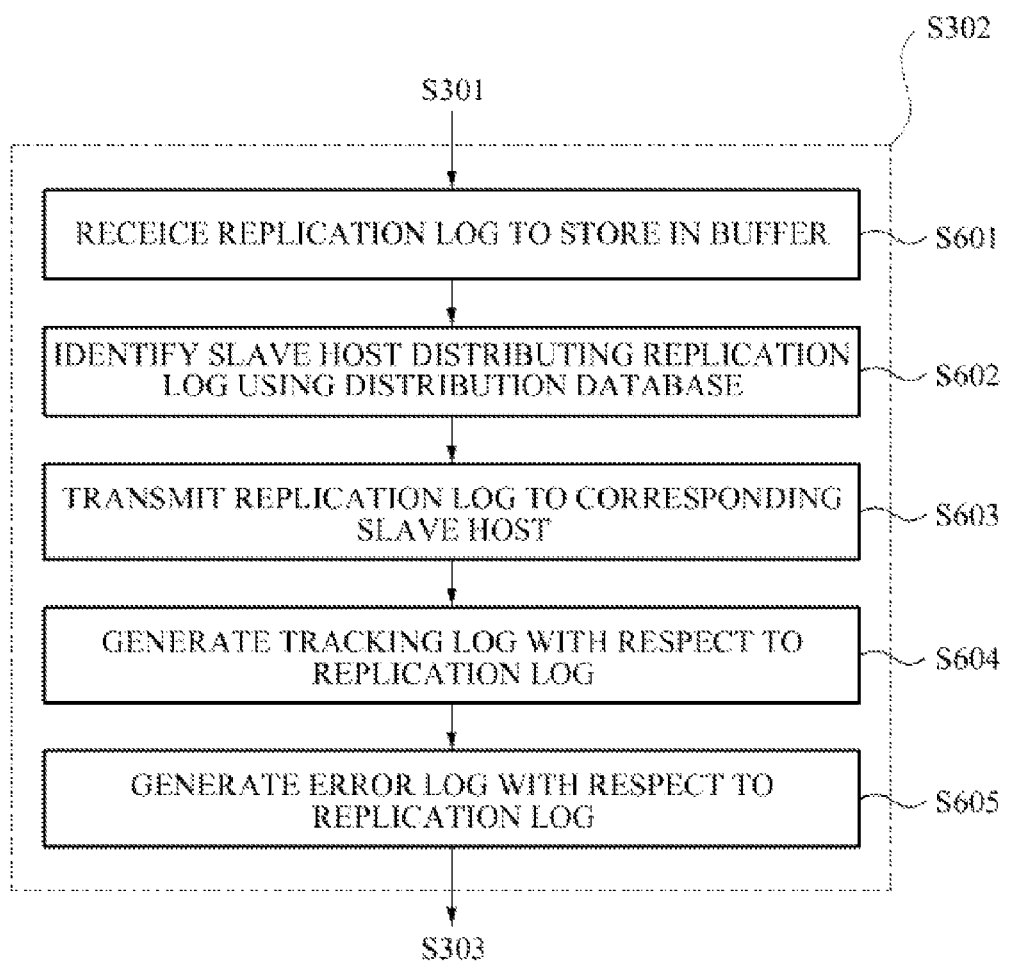
FIG. 6 is a flowchart illustrating a method for distributing a replication log in a distributor according to an exemplary embodiment of the invention.

FIG. 6 is a flowchart illustrating a method for distributing a replication log in a distributor according to an exemplary embodiment of the invention. Here, as illustrated in FIG. 6, operations S601 to S605 may be included and performed in operation S302 of FIG. 3. In this instance, the distributor 202 may include the distribution database 210 and the replication agent 209.

In operation S601, the replication agent 209 receives the replication log 208, and temporarily stores the received replication log 208. In this instance, as described above, the replication agent 209 may store a plurality of replication logs in the buffer, respectively, when the plurality of replication logs is received, and the stored replication logs may then be distributed to the corresponding slave host.

In operation S602, the replication agent 209 identifies the slave host distributing the replication log 208 using the distribution database 210. In this instance, the distribution database 210 may include disposition information of the master host 201 and slave host 203.

In operation S603, the replication agent 209 transmits the replication log 208 to the corresponding slave host. Specifically, the replication agent 209 may temporarily store the replication log 209 in the buffer, verify the slave database 205 of the slave host 203 receiving the replication log 209, and then transmit the replication log 208 to the slave host 203.

In operation S604, the replication agent 209 generates a tracking log with respect to the replication log 208. In this instance, the tracking log may include a log serial number with respect to the replication log 208 finally applied for each slave database included in the respective slave hosts.

In operation S605, the replication agent 209 generates an error log with respect to the replication log 208. Here, all errors generated while the replication agent 209 performs a replication operation may be recorded in the error log.

Figure 7:
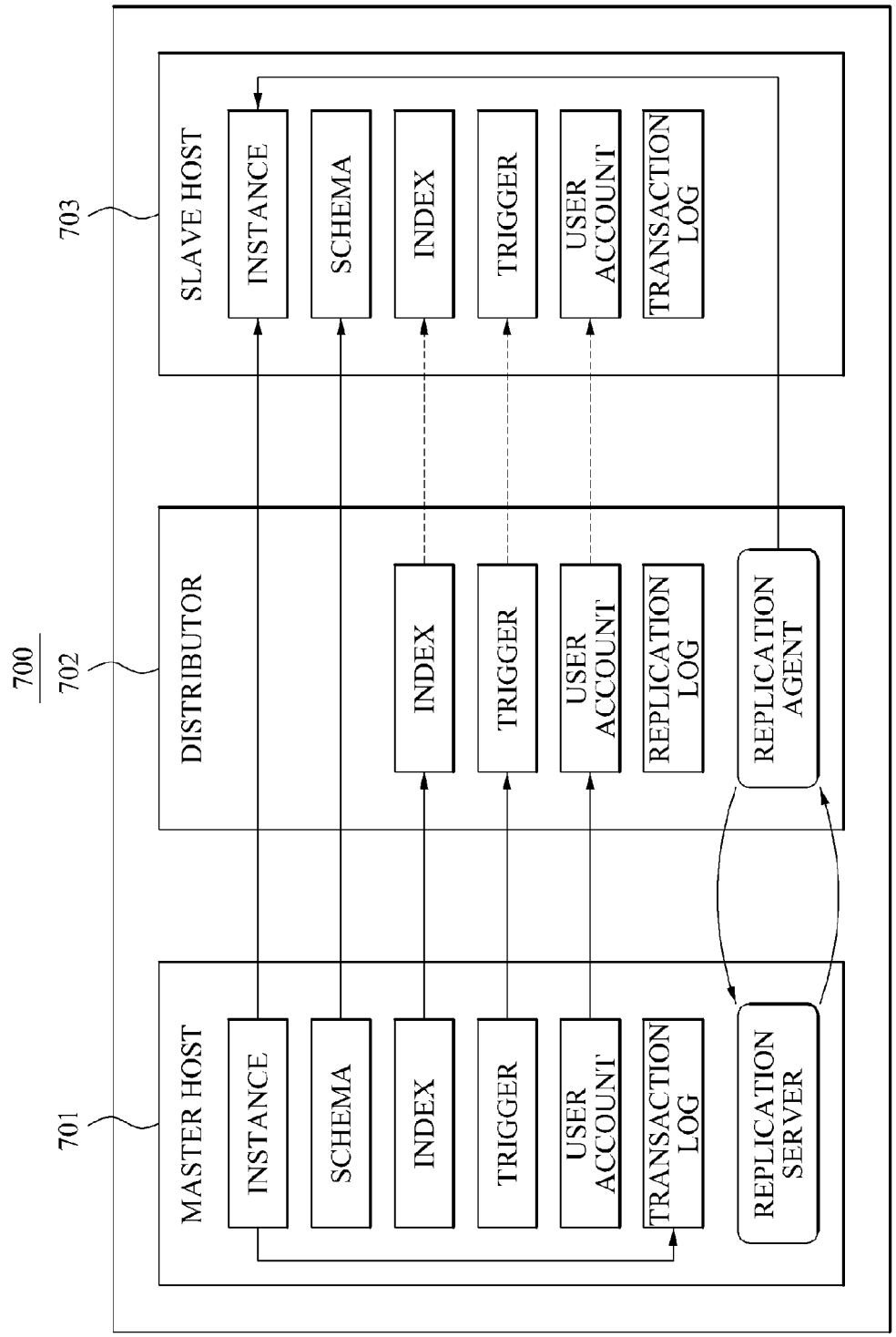
FIG. 7 is an example used for describing a replication method for each database object according to the present invention.

FIG. 7 is an example used for describing a replication method for each database object according to the present invention. Here, as illustrated in FIG. 7, modifications of information on a state and schema included in a master database of a master host 701 may be reflected in a slave host 703 through a distributor 702 in real time. In the case of an index, trigger, or user account, the modifications may be recorded only in the distribution database included in the distributor 702 for the purpose of independence of the slave database, and may not be recorded in the slave database. In this example, an 'instance' may denote each transaction.

In the above-described structure, when faults occur in the master database system 204 and the slave database 205 is required to be replaced with another master database, the index, trigger, or user account finally recorded in the distribution database 210 may be automatically reflected in the slave database 205. In this instance, when a primary key is used for identifying an object to be replicated, data to be replicated may include a table, in which the primary key from among the tables included in the master database, is set.

Figure 8:
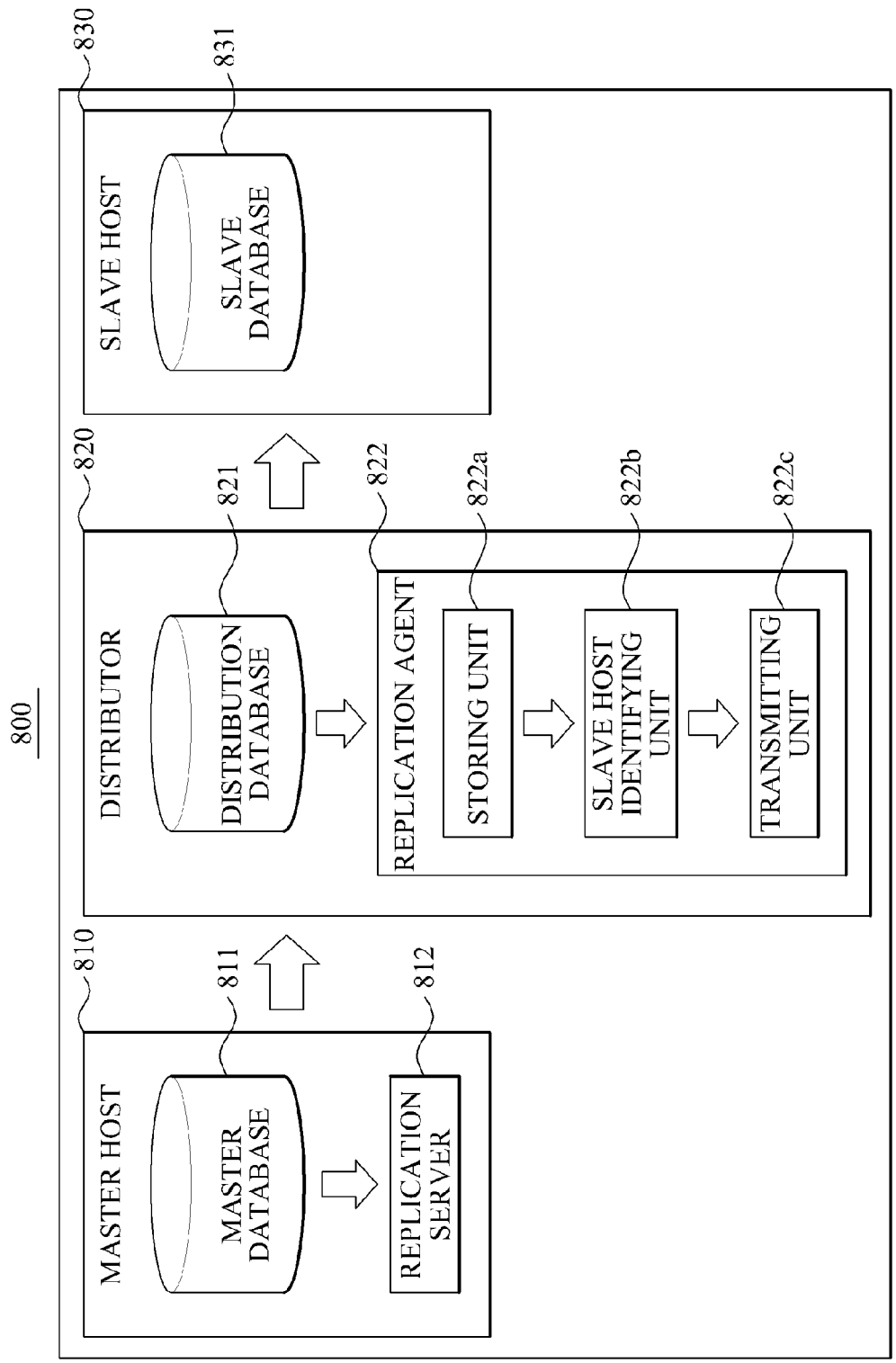
FIG. 8 is a block diagram illustrating an internal configuration of a data replication system according to another exemplary embodiment of the invention.

FIG. 8 is a block diagram illustrating an internal configuration of a data replication system according to another exemplary embodiment of the invention. As illustrated in FIG. 8, a data replication system 800 may include a master host 810, a distributor 820, and a slave host 830.

The master host 810 may include a master database 811 and a replication server 812, and generate a replication log through a transaction log of the master database 811 to thereby transmit the replication log to the distributor 820. In this instance, the master database 811 may be an original database being an object to be replicated, and the replication server 812 may analyze the transaction log of the master database 811 to thereby generate the replication log being composed of the modifications, and transmit the replication log to the distributor 820.

Here, the transaction log may be logs where a plurality of transactions, that is, all modifications generated in the master database, are recorded, and may include an undo log for archiving a previous data image in order to abort an updating operation, and a redo log for archiving a data image obtained after performing the updating operation in order to again perform the updating operation. The replication log includes the redo log. More specifically, the replication log may include a single transaction classified into the redo log for the purpose of sequentially processing the plurality of transactions.

Also, the replication server 812 may be a processor processing a transmission request for the transaction log received from at least one replication agent, and the processor may include a first thread for processing the transmission request and a second thread for verifying the transaction log through the master database 811. Specifically, the master host 810 may generate the replication log through the transaction log, that is, the modifications of the master database 811 using the replication server 812, and transmit the generated replication log to the distributor 820.

In addition, the master host 810 may include a first modification reflecting unit (not shown) for reflecting, in the slave database 831 included in the slave host 830, modifications with respect to a schema of the master database 811, and a second modification reflecting unit (not shown) for reflecting, in the distribution database 821 included in the distributor 820, modifications with respect to at least one of an index, trigger, and user account of the master database 811.

The distributor 820 may include a distribution database 821 and a replication agent 822. The distributor 820 may determine the slave host distributing the replication log, and distribute the replication log to the corresponding slave host 830. In this instance, the distribution database 821 may include disposition information of the master host 810 and the slave host 830, and the replication agent 822 may perform a replication of data using the replication log.

Here, the replication agent 822 may include a storing unit 822*a* for receiving the replication log received from the master host 810 to thereby temporarily store the received replication log, a slave host verifying unit 822*b* for verifying the slave host 830 using the distribution database, and a transmitting unit 822*c* for transmitting the replication log to the corresponding slave host 830. As a result, the modifications of the master database 811 may be reflected in the slave host 830.

Also, the replication agent 822 may generate a tracking log and error log with respect to the replication log. In this instance, the tracking log may include a log serial number with respect to the replication log finally applied for each slave database included in the respective slave hosts. All errors generated while the replication agent 822 performs a replication operation may be recorded in the error log.

In addition, the distributor 820 may reflect, in the slave host 830 acting as another master host when a fault occurs in the master host 810, the at least one of the index, trigger, and user account.

The slave host 830 may include a slave database 831, and receive the replication log to thereby reflect the received replication log in the slave database 831. In this instance, the slave database 831, that is the destination of the replication, is a database where data of the master database 811 is replicated, and may reflect modifications of the master database 811. As a result, the master database 811 and the slave database 831 are synchronized with each other, and upload and download of data are distributed and performed through the master database 811 and slave database 831, respectively, thereby reducing a load with respect to the read operation.

Figure 9:
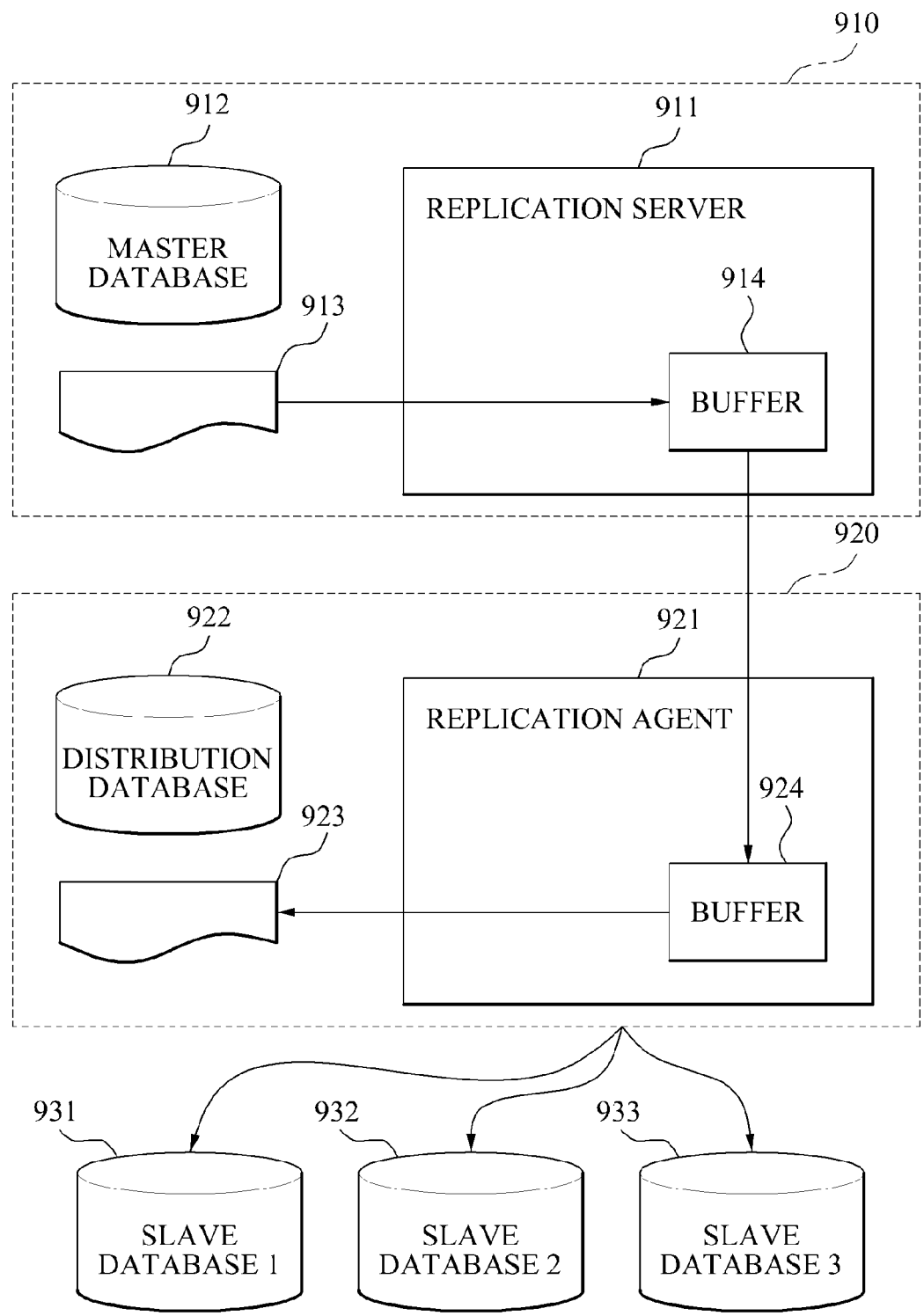
FIG. 9 is an example used for describing a structure of a replication server and replication agent according to the present invention.

FIG. 9 is an example used for describing a structure of a replication server 911 and replication agent 921 according to the present invention. Specifically, as illustrated in FIG. 9, the structure of the replication server 911 and replication agent 921 will be herein described in detail. A master host 910 and a slave host are connected with a ratio of 1:N therebetween.

The master host 910 may include the replication server 911 and the master database 912, and the replication server 911 may generate a replication log through a transaction log 913 included in the master database 912 to thereby store the generated replication log in a buffer 914, and transmit the stored replication log to a distributor 920.

Specifically, the replication server 911 is a processor for processing a transmission request for a transaction log 913 received from at least one replication agent, and may include a first thread for processing the transmission request, a second thread for verifying the transaction log through the master database 912, and the buffer 914 for storing the replication log generated through the transaction log 913.

In this instance, since the replication log may denote one transaction from among a plurality of transactions being composed in the transaction log 913, the replication log may be transmitted to the distributor 920 according to an order of the transaction.

The distributor 920 may include a replication agent 921 and a distribution database 922, and the replication agent 921 temporarily stores the replication log received from the replication server 911 in a buffer 924 before storing in a local disk 923.

Specifically, the replication agent 921 is a processor for storing, in the local disk 923, the replication log transmitted from the replication server 911 (i.e., transaction of the master database 912), analyzing the stored replication log, and reflecting the analyzed replication log in the slave databases 931 to 933. The replication agent 921 may transmit, to the slave host, a first thread for receiving the replication log to be stored in the buffer 924, a second thread for storing, in the local disk 923, the replication log stored in the buffer 924, and a third thread for reflecting modifications of the master database 912 in the slave databases 931 to 933 and for transmitting the replication log to the slave host.

Figure 10:
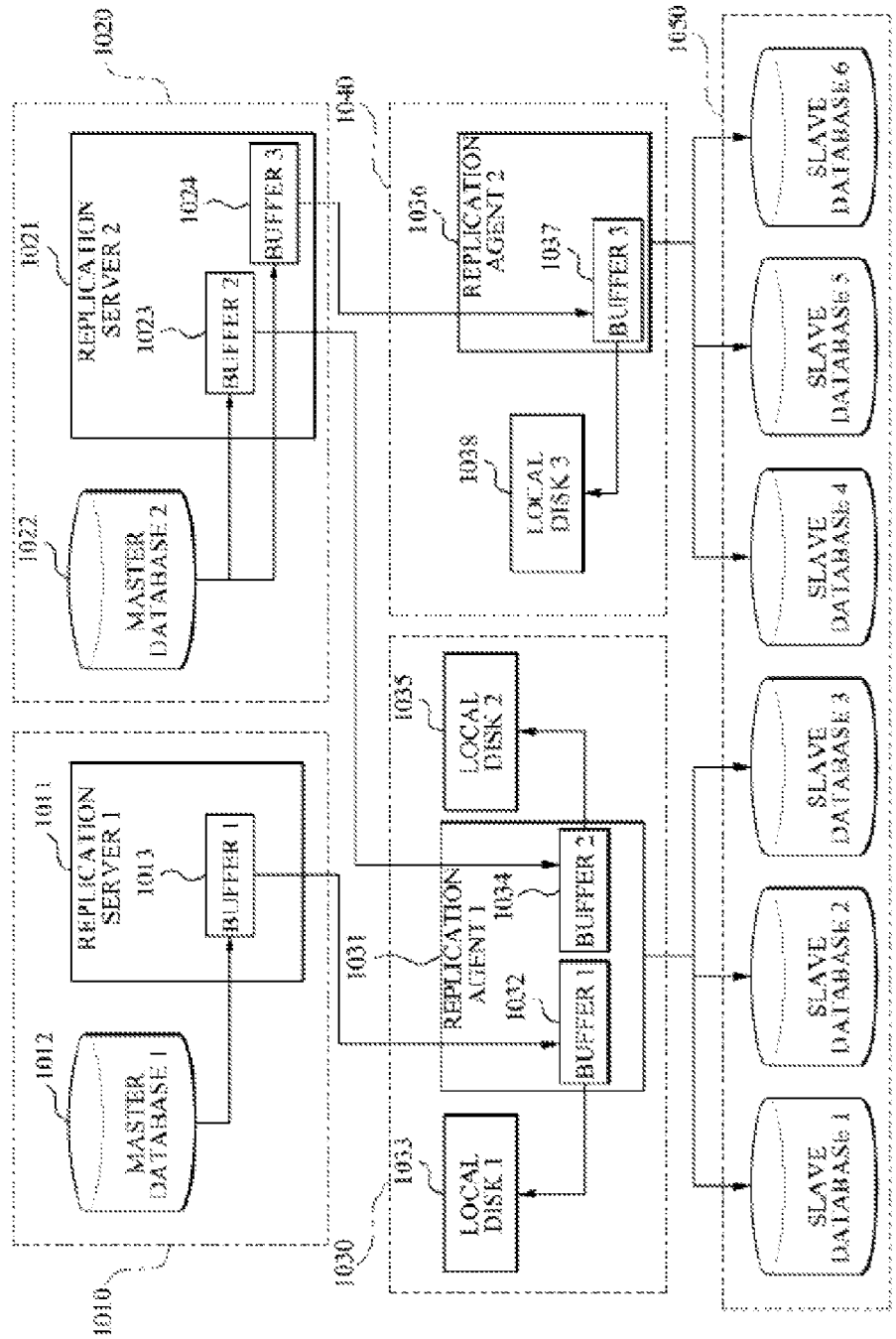
FIG. 10 is another example used for describing a structure of a replication server and replication agent according to the present invention.

FIG. 10 is another example for describing a structure of a replication server and replication agent according to the present invention. Specifically, as illustrated in FIG. 10, structures of the replication server and replication agent will be herein described in detail. For example, the master host and the slave host are connected with a ratio of 2:6, from among structures with a ratio of N:M therebetween.

Replication servers 1011 and 1021 included in respective master hosts 1010 and 1020 may transmit modifications of master databases 1012 and 1022, that is, each transaction, to distributors 1030 and 1040 sequentially predetermined through buffers 1013, 1023, and 1024, respectively.

The replication agents 1031 and 1038 included in the distributors 1030 and 1040 may receive and process the replication log. For example, the replication agent 1031 included in the distributor 1030 may temporarily store, in a buffer 1032, the replication log received from the replication server 1011 and then store the temporarily stored replication log in a local disk 1033. Also, the replication agent 1031 may temporarily store the replication log received from the replication server 1021 in a buffer 1034, and then store the temporarily stored replication log in a local disk 1035. Theses buffers 1032 and 1034 may be used for sequentially processing the replication log (i.e., the transaction).

As described above, the replication log transmitted to the distributors 1030 and 1040 may be reflected in the slave database 1050 of the corresponding slave host, thereby reflecting modifications of the master databases 1012 and 1022.

The data replication method according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, an aggravated load in a database may be distributed through a master database, a slave database, and a distributor. A master host may be replaced with a slave host when a fault occurs in a master host including the master database, thereby effectively coping with the fault. Changed contents with respect to only the slave database may be rapidly collected even when periodical collection with respect to simultaneously updated data is needed.

According to the present invention, when a schema is changed in a master database of a master host, the change may be replicated in the slave database of the slave host, and a desired replication environment such as a ratio of the master host to the slave host of N:M may be configured.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A data replication method in a Database Management System (DBMS), the data replication method comprising:
    generating a replication log through a transaction log of a master host and transmitting the generated replication log to a distributor which is used as a relay system between the master host and a plurality of slave hosts, the transaction log including,
        an undo log to archive a previous data image and to abort an updating operation, and
        a redo log to archive a data image obtained after performing the updating operation, and to repeat the updating operation, the replication log comprising the redo log;
    determining one or more slave hosts in charge of distributing the replication log among the plurality of slave hosts, and distributing the replication log from the distributor to the one or more determined slave hosts; and
    applying the replication log to the one or more determined slave hosts such that the replication log is reflected in the one or more determined slave hosts, wherein the replication log defines a desired replication configuration between the master host and the slave host to be N:M.

2. The method of claim 1, wherein the replication log comprises modifications of a master database of the master host, and generating a replication log further comprises:
    analyzing the transaction log in a replication server of a master host comprising the master database; and
    transmitting, by using a distributor, the replication log from the master host comprising a replication server to a replication agent of the distributor.

3. The method of claim 2, wherein the replication server is configured to process a transmission request associated with the transaction log, the transmission request being received from at least one replication agent, the replication server comprising a first thread for processing the transmission request and a second thread for verifying the transaction log through the master database.

4. The method of claim 2, wherein the replication server is configured temporarily to store the replication log using a plurality of buffers in response to generation of a plurality of replication logs, and wherein the replication server is configured to transmit the temporarily stored replication log to the replication agent of the distributor.

5. The method of claim 2, wherein the distributor comprises a distribution database and a replication agent, and determining one or more slave hosts among a plurality of slave hosts further comprises:
    receiving the replication log from the replication agent;
    storing, temporarily, the replication log;
    identifying, using the distribution database, slave host distributing the replication agent; and
    transmitting the replication log from the replication agent to the identified slave host.

6. The method of claim 5, wherein the distribution database comprises disposition information of the master host and the identified slave host.

7. The method of claim 5, wherein the replication agent is configured temporarily to store each of a plurality of replication logs in response to receiving the plurality of replication logs, and to the temporarily stored replication logs to the identified slave host.

8. The method of claim 5, wherein determining one or more slave hosts among a plurality of slave hosts further comprises generating, by the replication agent, a tracking log with respect to the replication log, and
    wherein the tracking log comprises a log serial number with respect to the replication log finally applied for each slave database of the one or more determined slave hosts.

9. The method of claim 5, wherein determining one or more slave hosts among a plurality of slave hosts further comprises:
    generating, by the replication agent, an error log with respect to the replication log, the error log comprising errors generated while the replication agent performs a replication operation.

10. The method of claim 1, wherein the master database is an object of the data replication, and a slave database of the slave host is a destination of the data replication and reflects modifications of the master database.

11. The method of claim 1, further comprising:
    applying modifications with respect to a schema of the master database to slave databases of the one or more determined slave hosts; and
    applying modifications with respect to at least one of an index, trigger, and user account of the master database to slave databases of the one or more determined slave hosts,
    wherein the distributor perform replications of the at least one of the index, trigger, and user account if the master host fails by executing a slave host to perform as the master host.

12. The method of claim 1, wherein a master host comprising a master database, and an asynchronous replication is performed through at least one distributor between the master host and the slave host for providing a customized replication configuration between the master host and the slave host.

13. A non-transitory computer-readable recording medium comprising an executable program, which when executed by a processor, performs a function according to the method of claim 1.

14. A data replication system in a Database Management System (DBMS), the data replication system comprising:
    at least one or more servers comprising at least one or more processors;
    a master host comprising a transaction log and a master database, the master host, executed by the at least one or more processors, to generate a replication log using the transaction log of the master database, the transaction log including, an undo log to archive a previous data image and to abort an updating operation, and a redo log to archive a data image obtained after performing the updating operation, and to repeat the updating operation, the replication log comprising the redo log; and a distributor, configured as a relay between the master host and a plurality of slave hosts and executed by the at least one or more processors, to determine one or more slave hosts among the plurality of slave hosts to distribute the replication log, and to distribute the replication log from the distributor to one or more determined slave hosts, wherein the replication log is applied to one or more slave databases of the determined one or more slave host such that the replication log is reflected in the one or more determined slave hosts, and wherein the replication log defines a desired replication configuration between the master host and the determined one or more slave hosts to be N:M.

15. The system of claim 14, wherein the replication log comprises modifications of the master database, and the master host further comprises:

the master database to perform as an original database to be an object of the data replication; and a replication server to analyze the transaction log of the master database, to generate the replication log, and to transmit the replication log to the distributor.

16. The system of claim 15, wherein the replication server is configured to process a transmission request associated with the transaction log, the transmission request received from at least one replication agent.

17. The system of claim 14, wherein the distributor further comprises:

a distribution database comprising disposition information of the master host and the slave host; and a replication agent to perform data replication using the replication log.

18. The system of claim 17, wherein the replication agent comprises:

a storing unit to receive the replication log received from the master host and to temporarily store the replication log;

a slave host verifying unit to identify the slave host using the distribution database; and a transmitting unit to transmit the replication log to the identified slave host.

19. The system of claim 14, wherein the master host further comprises:

a first modification reflecting unit to apply modifications with respect to a schema of the master database to the one or more slave databases; and a second modification reflecting unit to apply modifications with respect to at least one of an index, trigger, and user account of the master database to one or more distribution databases.

20. The system of claim 14, wherein the master host and the slave host have a ratio of N:M, and an asynchronous replication is performed through at least one distributor between the master host and the slave host.

\* \* \* \* \*